US 009939060 B2

United States Patent
Kato et al.

(10) Patent No.: US 9,939,060 B2
(45) Date of Patent: Apr. 10, 2018

(54) SHIFT DEVICE (71) Applicant: KABUSHIKI KAISHA TOKAI-RIKA-DENKI-SEISAKUSHO, Aichi (JP)

(72) Inventors: Daisuke Kato, Aichi (JP); Wataru Yumoto, Aichi (JP); Reiji Higuchi, Aichi (JP); Takehiro Niwa, Aichi (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 0 days.

(21) Appl. No.: 15/033,274

(22) PCT Filed: Oct. 14, 2014

(86) PCT No.: PCT/JP2014/077357
§ 371 (c)(1),
(2) Date: Apr. 29, 2016

(87) PCT Pub. No.: WO2015/072267
PCT Pub. Date: May 21, 2015

(65) Prior Publication Data
US 2016/0273648 A1 Sep. 22, 2016

(30) Foreign Application Priority Data
Nov. 14, 2013 (JP) ................. 2013-236164

(51) Int. Cl.
F16H 59/00 (2006.01)
F16H 59/10 (2006.01)
F16H 59/02 (2006.01)

(52) U.S. Cl.
CPC ...... *F16H 59/105* (2013.01); *B60Y 2400/301* (2013.01); *F16H 2059/0273* (2013.01)

(58) Field of Classification Search
CPC .......... F16H 59/105; F16H 2059/0273; B60Y 2400/301
(Continued)

(56) References Cited

U.S. PATENT DOCUMENTS 6,732,847 B1* 5/2004 Wang .................... F16H 59/105
74/473.12
7,650,811 B2* 1/2010 Matsui .................. F16H 59/105
74/473.12
(Continued)

FOREIGN PATENT DOCUMENTS

EP 1314916 A2 5/2003
EP 1589322 A1 10/2005
(Continued)

OTHER PUBLICATIONS

International Search Report issued in a corresponding application PCT/JP2014/077357 dated Jan. 13, 2015.
(Continued)

*Primary Examiner* — Victor MacArthur
(74) *Attorney, Agent, or Firm* — Roberts Mlotkowski Safran Cole & Calderon P.C.

(57) ABSTRACT

In a shift lever device, at a time when a shift lever is pivotally operated in a front-rear direction, a retainer and a link are pivoted integrally with the shift lever, and a pivot portion is pivoted in the front-rear direction. Further, at a time when the shift lever is pivotally operated in a left-right direction, the shift lever is pivoted with respect to the retainer, and the link is pivoted, and the pivot portion is thereby pivoted in the left-right direction. Moreover, a position of the pivot portion is detected by a detecting mechanism, and a shift position of the shift lever is detected. Therefore, the shift position of the shift lever can be detected via the link.

8 Claims, 5 Drawing Sheets (58) Field of Classification Search
USPC .......................................... 74/473.18, 473.33
See application file for complete search history.

(56) References Cited

U.S. PATENT DOCUMENTS

| | | | |
|---|---|---|---|
| 7,750,624 B2* | 7/2010 | Heo .................... | F16H 59/0204 74/473.12 |
| 2003/0098218 A1* | 5/2003 | Syamoto ............. | F16H 59/0204 192/220.4 |
| 2005/0235771 A1* | 10/2005 | Yokoyama .......... | F16H 59/0204 74/473.33 |
| 2014/0033849 A1* | 2/2014 | Yamamoto .......... | F16H 59/0217 74/473.12 |

FOREIGN PATENT DOCUMENTS

| | | | |
|---|---|---|---|
| JP | 2008-044393 A | 2/2008 |
| JP | 2008302816 A | 12/2008 |
| JP | 2010-105622 A | 5/2010 |
| JP | 2012-046046 A | 3/2012 |
| JP | 2013-103668 A | 5/2013 |
| JP | 2013-107508 A | 6/2013 |

OTHER PUBLICATIONS

Office Action dated Nov. 4, 2014 in a corresponding Japanese application No. 2013-236164.
Office Action dated Jul. 7, 2015 in a corresponding Japanese application No. 2013-236164.
EPO Search Report European Application No. 14861660.0, dated May 22, 2017.

* cited by examiner

SHIFT DEVICE

CROSS-REFERENCE TO RELATED APPLICATIONS

The present application is a U.S. National Phase of PCT/JP2014/077357 filed on Oct. 14, 2014 claiming priority to Japanese Patent application No. 2013-236164 filed Nov. 14, 2013. The disclosure of the PCT Application is hereby incorporated by reference into the present Application.

TECHNICAL FIELD

The present invention relates to a shift device at which a shift position is changed by a shift member being operated.

BACKGROUND ART

In the shift device of Japanese Patent Application Laid-Open (JP-A) No. 2008-44393, a second link is pivotably connected to a shift lever, and a sensor magnet is provided at the second link. Due to the shift lever being operated, the second link is pivoted, and the sensor magnet is pivoted. Due thereto, the shift position is detected due to a Hall element detecting the position of the sensor magnet.

By the way, in this shift device, in a case in which the shift lever is operated in one direction, the shift position of the shift lever is detected via the second link.

Here, in such a shift device, it is preferable to be able to detect the shift position of the shift lever via the second link, even in cases in which the shift lever is operated in one direction and another direction.

SUMMARY OF INVENTION

Technical Problem

In view of the above-described circumstances, an object of the present invention is to provide a shift device that can detect the position of a shift body via a moving body, even in cases in which the shift body is operated in one direction and another direction.

Solution to Problem

A shift device of a first aspect of the present invention comprises: a shift body whose shift position is changed due to the shift body being operated in one direction and another direction; an intermediate body that supports the shift body, and that enables operation of the shift body in the other direction; a supporting body that supports the intermediate body, and that enables operation of the shift body in the one direction; a moving body that is connected to the shift body and the intermediate body, and that is provided with a moving portion which is moved due to the shift body being operated in the one direction and the other direction; and detecting means for detecting the shift position of the shift body, by detecting the moving portion.

In the shift device of the first aspect of the present invention, the shift position is changed due to the shift body being operated in the one direction and the other direction. Further, the intermediate body supports the shift body, and operation of the shift body in the other direction is enabled. The supporting body supports the intermediate body, and operation of the shift body in the one direction is enabled.

The moving body is connected to the shift body and the intermediate body. Due to the shift body being operated in the one direction and the other direction, the moving portion of the moving body is moved. Moreover, the shift position of the shift body is detected due to the detecting means detecting the moving portion. Therefore, the shift position of the shift body can be detected via the moving body.

In a shift device of a second aspect of the present invention, in the shift device of the first aspect of the present invention, at a time when the shift body is operated, a moved amount of the moving portion is amplified with respect to a moved amount at a disposed position of the shift body where it is assumed that the shift body is disposed at the disposed position at which the moving portion is disposed.

In the shift device of the second aspect of the present invention, at the time when the shift body is operated, the moved amount of the moving portion is amplified with respect to the moved amount at a disposed position of the shift body where it is assumed that the shift body is disposed at that disposed position at which the moving portion is disposed. Therefore, the moved amount of the moving portion that is due to operation of the shift body can be made to be large, and the accuracy of detecting the shift position of the shift body can be improved.

In a shift device of a third aspect of the present invention, in the shift device of the second aspect of the present invention, the moved amount of the moving portion is amplified with respect to a moved amount at the disposed position of the shift body, at a time when the shift body is operated in one of the one direction or the other direction, the one of the one direction or the other direction being a direction in which the moved amount at the disposed position of the shift body is smaller.

In the shift device of the third aspect of the present invention, at a time when the shift body is operated in one of the one direction or the other direction, the one of the one direction or the other direction being the direction in which the moved amount at the disposed position of the shift body is smaller, the moved amount of the moving portion is amplified with respect to the moved amount at the disposed position of the shift body. Therefore, even if the moved amount at the disposed position of the shift body, that is due to operation of the shift body, is small, the moved amount of the moving portion due to operation of the shift body can be made to be large, and the accuracy of detecting the shift position of the shift body can be improved.

A shift device of a fourth aspect of the present invention comprises, in the shift device of any one of the first aspect through the third aspect of the present invention, an assisting portion that is provided at the moving body at a region other than regions connected to the shift body and the intermediate body, movement of the moving portion with respect to the shift body being limited at the assisting portion at a time when the shift body is operated in the one direction, and movement of the moving portion with respect to the shift body being guided at the assisting portion at a time when the shift body is operated in the other direction.

In the shift device of the fourth aspect of the present invention, the assisting portion is provided at the moving body at a region other than regions that are connected to the shift body and the intermediate body. Movement of the moving portion with respect to the shift body is limited by the assisting portion at the time when the shift body is operated in the one direction. Movement of the moving portion with respect to the shift body is guided at the time when the shift body is operated in the other direction. Therefore, due to the movement of the moving portion, that is due to operation of the shift body, being assisted by the assisting portion, the accuracy of the moved position of the moving portion due to operation of the shift body can be increased, and the accuracy of detecting the shift position of the shift body can be improved.

In a shift device of a fifth aspect of the present invention, in the shift device of any one of the first aspect through the fourth aspect of the present invention, in cases in which the moving body is disposed symmetrically with respect to a plane that is orthogonal to the one direction or the other direction, a range of movement of the moving portion in the one direction and a range of movement of the moving portion in the other direction are not changed.

In the shift device of the fifth aspect of the present invention, in cases in which the moving body is disposed symmetrically with respect to the plane that is orthogonal to the one direction or the other direction, the range of movement of the moving portion in the one direction and the range of movement of the moving portion in the other direction are not changed. Therefore, even in cases in which the moving body is disposed symmetrically with respect to the plane that is orthogonal to the one direction or the other direction at the time when the moving body is used in common at a right-hand drive vehicle and a left-hand drive vehicle, the range of movement of the moving portion in the one direction and the range of movement of the moving portion in the other direction are not changed. Due thereto, the moving body can be used in common at the right-hand drive vehicle and the left-hand drive vehicle.

In a shift device of a sixth aspect of the present invention, in the shift device of any one of the first aspect through the fifth aspect of the present invention, due to the shift body being operated in at least one of the one direction or the other direction, the moving portion is pivoted, the detecting means detects a position in a pivoting tangent direction at a central pivoted position of the moving portion, and the moving portion is closest to the detecting means at the central pivoted position.

In the shift device of the sixth aspect of the present invention, the moving portion is pivoted due to the shift body being operated in at least one of the one direction or the other direction. Moreover, the detecting means detects the position in the pivoting tangent direction at the central pivoted position of the moving portion.

Here, the moving portion is closest to the detecting means at the central pivoted position. Therefore, the amount by which the moving portion approaches and moves away from the detecting means (the amount of displacement in the pivoting radius direction at the central pivoted position of the moving portion) can be made to be small, and the detecting means can be made to be compact.

DESCRIPTION OF EMBODIMENTS

First Embodiment

Figure 1:
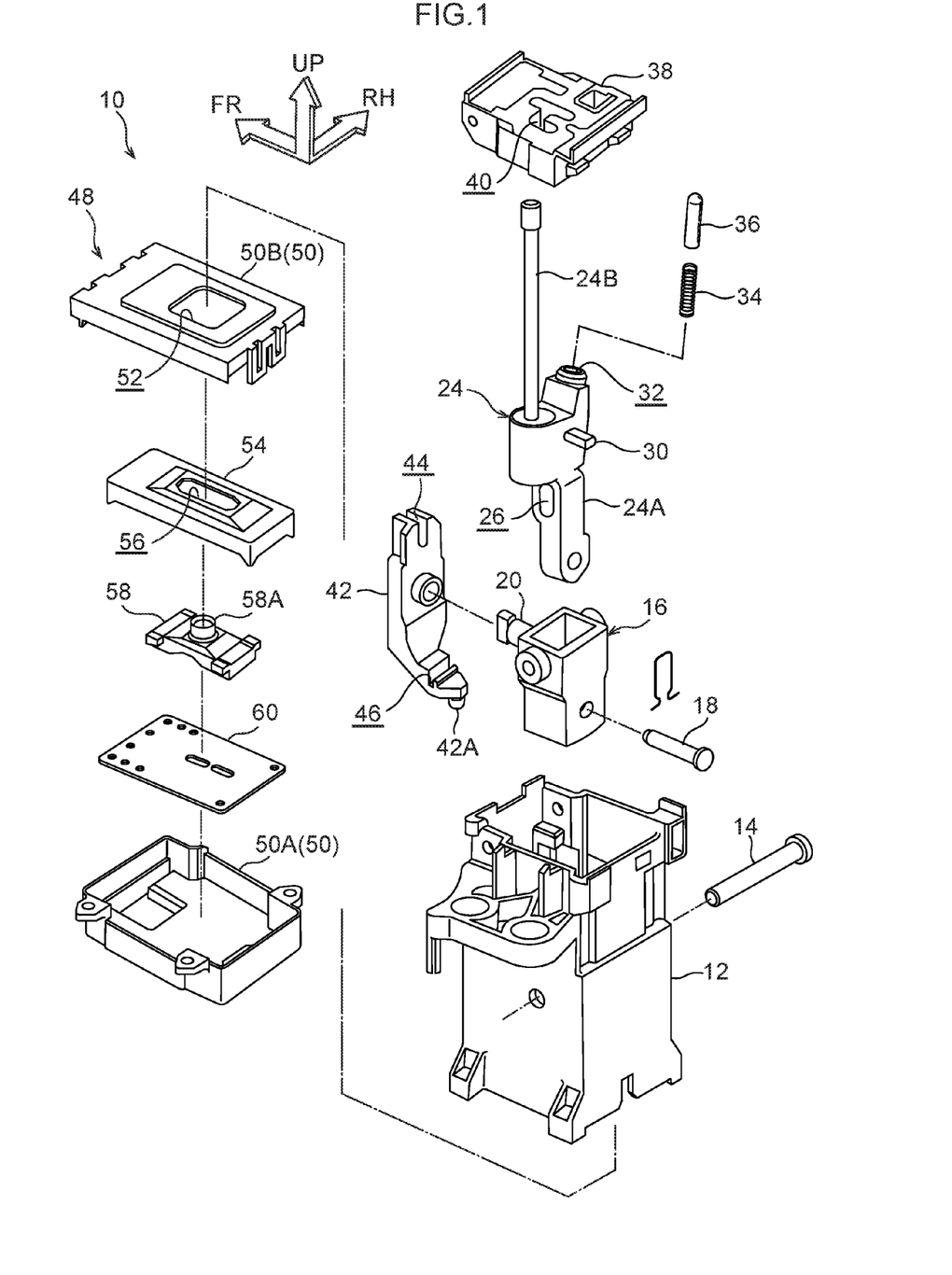
FIG. 1 is an exploded perspective view that is seen obliquely from a rear left side and shows a shift lever device relating to a first embodiment of the present invention.

A shift lever device 10 that serves as a shift device relating to a first embodiment of the present invention is shown in FIG. 1 in an exploded perspective view that is seen obliquely from a rear left side. Note that, in the drawings, the frontward direction of the shift lever device 10 is indicated by arrow FR, the rightward direction of the shift lever device 10 is indicated by arrow RH, and the upward direction of the shift lever device 10 is indicated by arrow UP.

The shift lever device 10 relating to the present embodiment is applied to a vehicle (an automobile), and the shift lever device 10 is a so-called floor-type device and is set at the floor portion (the floor) of the vehicle cabin. The vehicle is a right-hand drive vehicle, and the driver's seat is disposed at the front side and the right side of the vehicle cabin, and the shift lever device 10 is disposed at the vehicle cabin left side of the driver's seat. Further, the frontward direction, the rightward direction and the upward direction of the shift lever device 10 are directed in the vehicle frontward direction, the vehicle rightward direction and the vehicle upward direction, respectively.

As shown in FIG. 1, a plate 12, that is substantially rectangular tube shaped and serves as a supporting body, is provided at the shift lever device 10, and the top surface and the bottom surface of the plate 12 are open. A shift shaft 14, that is substantially cylindrical and serves as a first shaft, is passed-through a vertical direction intermediate portion of the plate 12, and the axial direction of the shift shaft 14 is disposed parallel to the left-right direction.

A retainer 16, that is substantially shaped as a rectangular tube having a bottom and that serves as an intermediate body, is accommodated within the plate 12, and the top surface of the retainer 16 is open. The shift shaft 14 is passed-through the upper portion of the retainer 16, and the retainer 16 is made able to pivot in the front-rear direction around the shift shaft 14. A select shaft 18, that is substantially cylindrical and serves as a second shaft, is passed-through the lower end portion of the retainer 16, and the axial direction of the select shaft 18 is disposed parallel to the front-rear direction.

Figure 2:
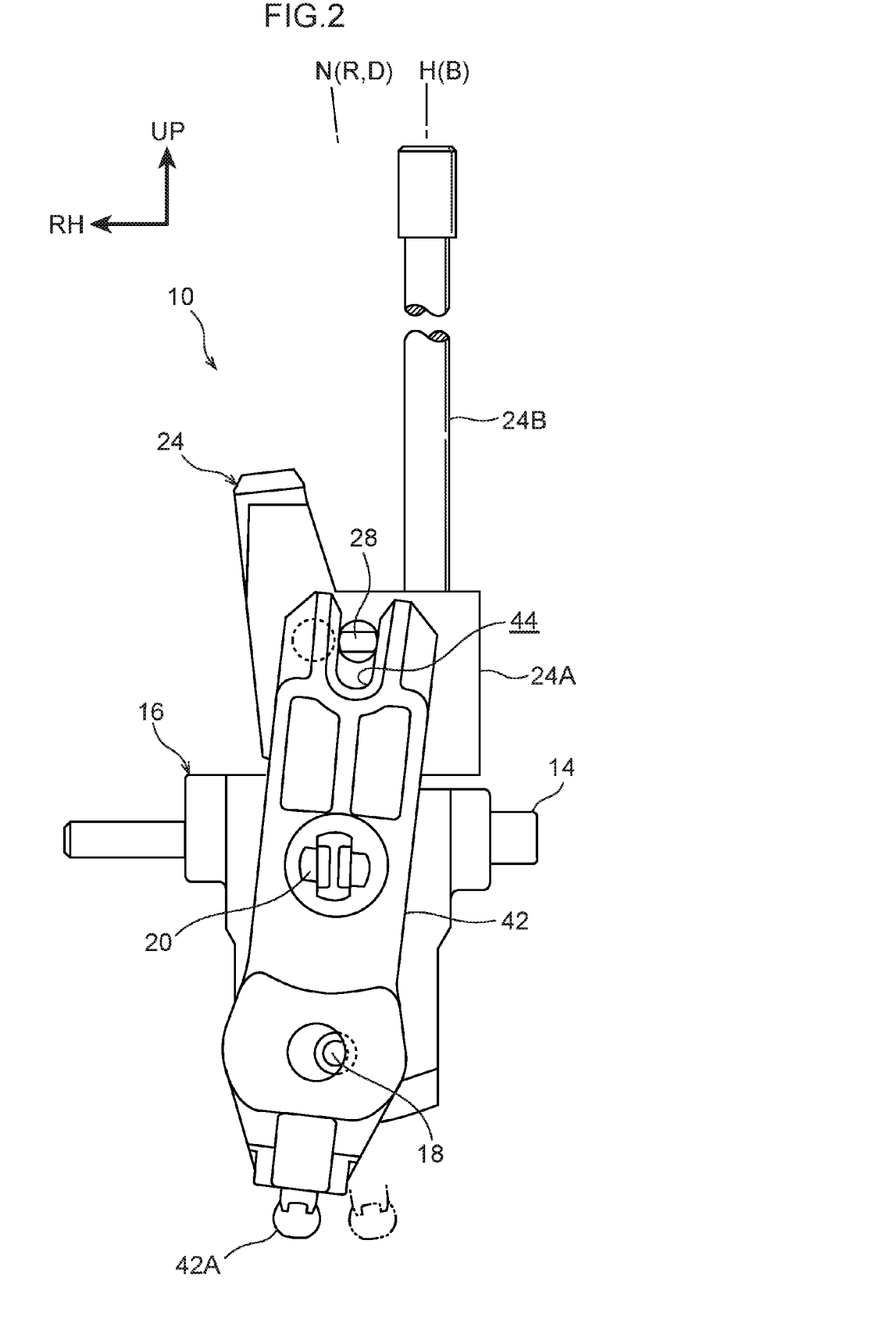
FIG. 2 is a front view that is seen from the front and shows main portions of the shift lever device relating to the first embodiment of the present invention.
Figure 3:
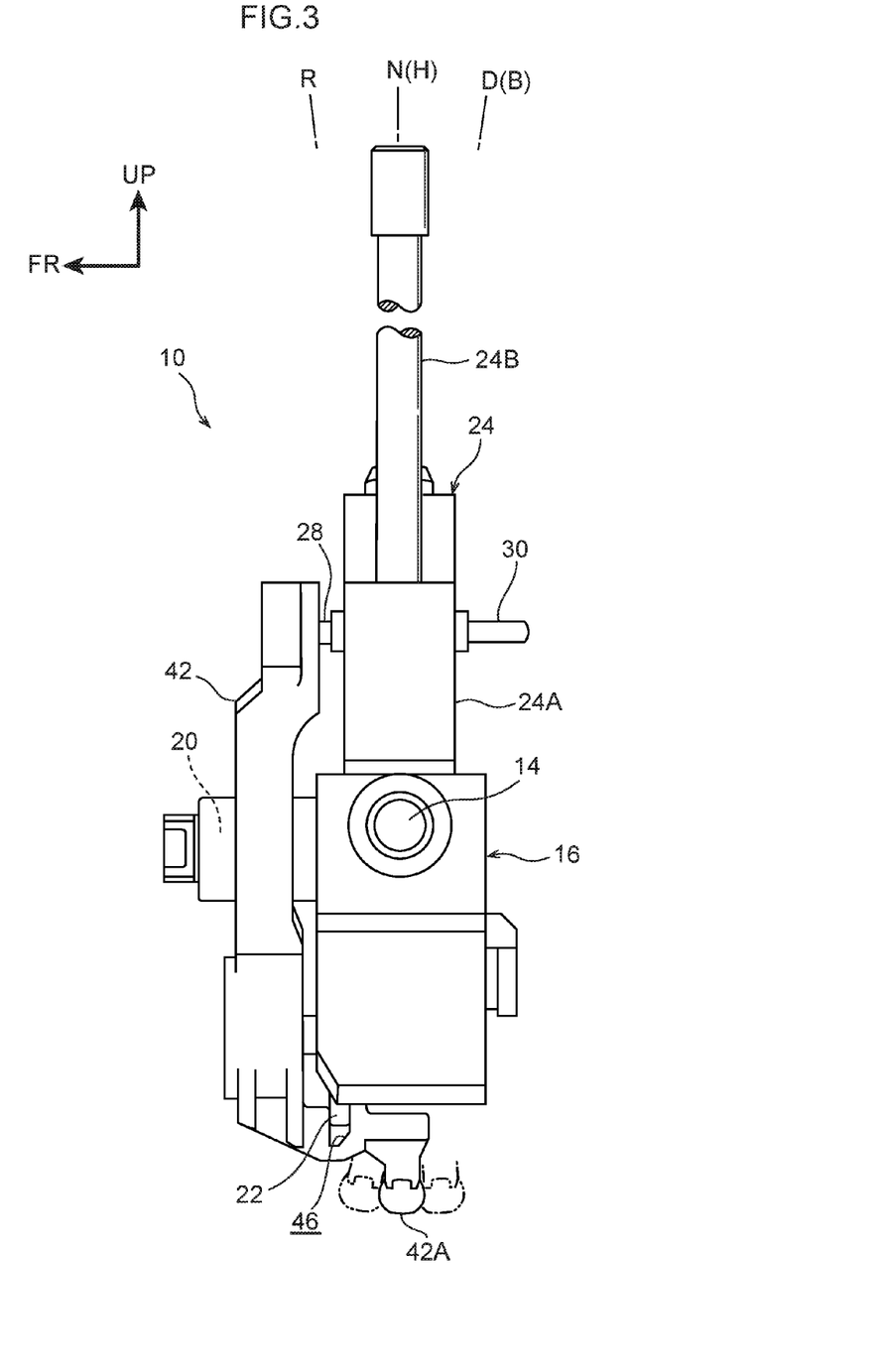
FIG. 3 is a side view that is seen from the left and shows main portions of the shift lever device relating to the first embodiment of the present invention.

As shown in FIG. 1 through FIG. 3, a connecting shaft 20, that is cylindrical and serves as a first connecting portion, is provided integrally with the upper portion of the front surface of the retainer 16, at the center in the left-right direction. The connecting shaft 20 extends-out from the retainer 16 toward the front side, and the axial direction thereof is disposed parallel to the front-rear direction. An assisting plate 22 that, is flat-plate-shaped and serves as an engaging portion, is provided integrally with the front portion of the bottom surface of the retainer 16, at the center in the left-right direction. The assisting plate 22 extends-out from the retainer 16 toward the lower side, and the plate surface direction thereof is disposed orthogonal to the front-rear direction.

A shift lever 24 that serves as a shift body is inserted in the retainer 16. The shift lever 24 is made to be a shape that has planar symmetry with respect to a front-rear direction central plane that is orthogonal to the left-right direction. A shift portion 24A that is substantially block-shaped is provided at the lower side portion of the shift lever 24. The portion, that is further toward the lower side than a vertical direction intermediate portion, of the shift portion 24A is disposed within the retainer 16.

A through-hole 26 is formed in the vertical direction intermediate portion of the shift portion 24A, and the shift shaft 14 is passed therethrough. The select shaft 18 is passed-through the lower end portion of the shift portion 24A. Therefore, the shift lever 24 is made able to pivot (move) in the front-rear direction around the shift shaft 14, integrally with the retainer 16 (including the select shaft 18). Moreover, the through-hole 26 of the shift portion 24A is elongated in the vertical direction, and permits pivoting of the shift portion 24A in the left-right direction with respect to the shift shaft 14. The shift lever 24 is made able to pivot (move) in the left-right direction around the select shaft 18 with respect to the retainer 16 (including the shift shaft 14).

A pair of connecting pillars 28, 30, that are shaped as pillars and serve as second connecting portions, are provided integrally with the upper portion of the shift portion 24A. The pair of connecting pillars 28, 30 extend-out from the shift portion 24A in the frontward direction and the rearward direction, respectively. The axial directions of the connecting pillars 28, 30 are disposed parallel to the front-rear direction, and at least the right surfaces and the left surfaces of the connecting pillars 28, 30 are curved around the central axes of the connecting pillars 28, 30.

A detent hole 32, that is cylindrical and structures a detent means, is formed in the upper portion of the shift portion 24A. The axial direction of the detent hole 32 is disposed substantially parallel to the vertical direction, and the upper side of the detent hole 32 is open. A compression coil spring 34, that serves as an urging means and that structures the detent means, is inserted in the detent hole 32, and the lower end (an axial direction one end) of the compression coil spring 34 is anchored on the lower surface (bottom surface) of the detent hole 32. A detent pin 36, that is substantially cylindrical and serves as a detent member and structures the detent means, is fit into the detent hole 32 at the upper side of the compression coil spring 34. The detent pin 36 is urged toward the upper side by the compression coil spring 34, and projects-out at the upper side of the detent hole 32.

A lever 24B that is cylindrical is provided at the upper side portion of the shift lever 24, and the axial direction of the lever 24B is disposed parallel to the vertical direction, and the lever 24B extends-out upward from the plate 12. Therefore, due to the lever 24B being operated in the front-rear direction and the left-right direction by an occupant (the driver) of the vehicle, the shift lever 24 is pivotally operated respectively in the front-rear direction (the shifting direction, one direction) and the left-right direction (the selecting direction, another direction) that are orthogonal to (intersect) one another.

A gate plate 38, that is substantially rectangular plate-shaped and serves as a guide body, is fixed to the upper end of the plate 12, and the gate plate 38 covers the top surface of the plate 12. A guide hole 40 of a predetermined shape (in the present embodiment, a backwards h-shape as seen in plan view) is formed so as to pass-through the gate plate 38, and the lever 24B of the shift lever 24 is passed-through the guide hole 40. Therefore, pivoting of the lever 24B is regulated by the peripheral surface of the guide hole 40, and the pivoting range of the shift lever 24 is prescribed, and pivoting of the lever 24B is guided by the guide hole 40, and pivoting operation of the shift lever 24 is guided.

The shift position of the shift lever 24 is at an "H" position (home position) that serves as a predetermined position, and, due to the shift lever 24 being pivotally operated from the "H" position toward the rear side, the shift position of the shift lever 24 is changed to a "B" position (brake position), and, due to the shift lever 24 being pivotally operated from the "H" position toward the right side, the shift position of the shift lever 24 is changed to an "N" position (neutral position). Moreover, due to the shift lever 24 being pivotally operated from the "N" position toward the rear side, the shift position of the shift lever 24 is changed to a "D" position (drive position), and, due to the shift lever 24 being pivotally operated from the "N" position toward the front side, the shift position of the shift lever 24 is changed to an "R" position (reverse position).

A detent surface (not shown) that structures the detent means is formed at the bottom surface of the gate plate 38, and the detent pin 36 of the shift lever 24 is made to abut the detent surface by the urging force of the compression coil spring 34. At the time when the shift lever 24 is pivotally operated from the "H" position, accompanying the moving away of the shift lever 24 from the "H" position, the detent pin 36 is pushed by the detent surface and is moved within the detent hole 32, and, due thereto, the amount of compression of the compression coil spring 34 is increased, and the urging force of the compression coil spring 34 is increased. Therefore, at the time when the pivoting operation force is released in the state in which the shift lever 24 is disposed at a position other than the "H" position, the shift lever 24 is pivoted (returned) to the "H" position by the urging force of the compression coil spring 34.

A vertical direction intermediate portion of a link 42, that is substantially L-shaped in cross-section and that serves as a moving body, is supported by (connected to) the connecting shaft 20 of the retainer 16, and the link 42 is made able to pivot (move) in the left-right direction around the connecting shaft 20. A connecting hole 44 is formed so as to pass-through the upper portion of the link 42, and the connecting hole 44 opens toward the upper side. The connecting pillar 28 at the front side of the shift lever 24 (the shift portion 24A) is inserted in (connected to) the connecting hole 44, and the right surface and the left surface of the connecting hole 44 are made to abut the right surface and the left surface of the connecting pillar 28, respectively. The connecting hole 44 is elongated in the substantially vertical direction. Due thereto, due to pivoting of the connecting hole 44 in the left-right direction with respect to the connecting pillar 28, that is due to pivoting of the link 42 in the left-right direction, being permitted, the link 42 is pivoted in the left-right direction due to the shift lever 24 being pivotally operated in the left-right direction.

The link 42 is made to be a shape that is symmetrical with respect to a transverse direction central plane that is orthogonal to the transverse direction (the substantially left-right direction), and the transverse direction central plane of the link 42 is tilted in a direction of heading toward the right while heading downward.

The lower end portion of the link 42 extends-out toward the rear side and reaches the lower side of the retainer 16. An assisting hole 46, that is rectangular in cross-section and serves as an assisting portion, is formed in the lower end portion of the link 42. The assisting hole 46 is elongated in the transverse direction of the link 42, and opens at the both transverse direction outer sides of the link 42, and opens toward the upper side. The assisting plate 22 of the retainer 16 is inserted in (engaged with) the assisting hole 46, and the front surface and the rear surface of the assisting plate 22 are respectively made to abut the front surface and the rear surface of the assisting hole 46. Therefore, at the time when the shift lever 24 is pivotally operated in the front-rear direction, pivoting of the assisting hole 46 in the front-rear direction with respect to the assisting plate 22 is limited, and pivoting of the link 42 in the front-rear direction with respect to the retainer 16 is limited. Moreover, at the time when the shift lever 24 is pivotally operated in the left-right direction, pivoting of the assisting hole 46 in the left-right direction with respect to the assisting plate 22 is guided, and pivoting of the link 42 in the left-right direction with respect to the retainer 16 is guided.

A pivot portion 42A, that is substantially spherical and serves as a moving portion, is provided integrally with the lower end portion of the link 42. The pivot portion 42A projects-out toward the lower side, and is closer to the select shaft 18 in the vertical direction than the shift shaft 14. At the time when the shift lever 24 is pivotally operated in the front-rear direction, due to the link 42 being pivoted in the front-rear direction integrally with the shift lever 24 and the retainer 16, the pivot portion 42A is pivoted in the front-rear direction. At the time when the shift lever 24 is pivotally operated in the left-right direction, the shift lever 24 is pivoted in the left-right direction with respect to the retainer 16, and, due to the link 42 being pivoted in the left-right direction with respect to the retainer 16, the pivot portion 42A is pivoted in the left-right direction.

The separated distance in the vertical direction between the central axis of the connecting pillar 28 of the shift lever 24 and the central axis of the select shaft 18 (the central pivoting axis of the shift lever 24 in the left-right direction) is made to be large as compared with the separated distance in the vertical direction between the center of a disposed position of the shift lever 24, where it is assumed that the shift lever 24 is disposed at that disposed position at which the pivot portion 42A is disposed, and the central axis of the select shaft 18. At the time when the shift lever 24 is pivotally operated in the left-right direction, the pivoted distance of the connecting shaft 28 in the left-right direction is amplified with respect to the pivoted distance in the left-right direction at that disposed position of the shift lever 24. Moreover, the separated distance in the vertical direction between the center of the pivot portion 42A and the central axis of the connecting shaft 20 of the retainer 16 (the central pivoting axis of the link 42 in the left-right direction) is made to be large as compared with the separated distance in the vertical direction of the central axis of the connecting pillar 28 and the central axis of the connecting shaft 20. At the time when the shift lever 24 is pivotally operated in the left-right direction, the pivoted distance of the pivot portion 42A in the left-right direction is amplified with respect to the pivoted distance of the connecting pillar 28 in the left-right direction. Therefore, at the time when the shift lever 24 is pivotally operated in the left-right direction, the pivoted distance of the pivot portion 42A in the left-right direction is amplified with respect to the pivoted distance in the left-right direction at that disposed position of the shift lever 24.

At the time when the shift lever 24 is pivotally operated in the front-rear direction in the range between the "R" position and the "D" position, the pivot portion 42A is disposed at the lowest position (see FIG. 3) at the central pivoted position (the position of the center of the range of pivoting, the "N" position of the shift lever 24) of the pivot portion 42A in the front-rear direction. Therefore, the pivoting tangent direction at the central pivoted position of the pivot portion 42A in the front-rear direction is made to be parallel to the front-rear direction.

At the time when the shift lever 24 is pivotally operated in the left-right direction in the range between the "H" position and the "N" position, the pivot portion 42A is disposed at the lowest position (see FIG. 2) at the central pivoted position (the position of the center of the range of pivoting) of the pivot portion 42A in the left-right direction. Therefore, the pivoting tangent direction at the central pivoted position of the pivot portion 42A in the left-right direction is made to be parallel to the left-right direction.

A detecting mechanism 48 that serves as a detecting means is fixed to the lower side of the plate 12, and the detecting mechanism 48 covers the bottom surface of the plate 12.

A housing 50 that is substantially parallelepiped box shaped is provided at the detecting mechanism 48. The housing 50 is structured by a case 50A at the lower side and a cover 50B at the upper side being assembled. Further, an exposure hole 52 that is rectangular is formed so as to pass-through the upper wall of the cover 50B.

A first slider 54 that is substantially parallelepiped box shaped is provided within the housing 50. The lower surface of the first slider 54 is open, and the first slider 54 can slide in the left-right direction with respect to the housing 50. An insert-through hole 56 that is substantially rectangular is formed so as to pass-through the upper wall of the first slider 54, and the insert-through hole 56 is elongated in the front-rear direction.

A second slider 58, that is substantially rectangular plate-shaped and that serves as a connecting member, is provided within the first slider 54. The second slider 58 can slide (move) in the front-rear direction with respect to the first slider 54, and can slide (move) integrally with the first slider 54 in the left-right direction. A connecting tube 58A, that is cylindrical tube-shaped and serves as a connecting portion, is provided integrally with the second slider 58. The connecting tube 58A projects-out toward the upper side, and, due to the connecting tube 58A being inserted-through the insert-through hole 56 of the first slider 54 and the exposure hole 52 of the cover 50B, the connecting tube 58A is exposed to the upper side via the insert-through hole 56 and the exposure hole 52. The pivot portion 42A of the link 42 is fit into the connecting tube 58A so as to be pivotable and slidable. Due to the pivot portion 42A being pivoted in the front-rear direction, the second slider 58 is slid in the front-rear direction with respect to the first slider 54. Due to the pivot portion 42A being pivoted in the left-right direction, the second slider 58 is slid integrally with the first slider 54 in the left-right direction. A magnet (not illustrated) is provided at the second slider 58, and the magnet can slide integrally with the second slider 58 in the front-rear direction and the left-right direction.

A circuit board 60, that is rectangular and serves as a detecting portion, is provided at the lower side of the second slider 58, and the circuit board 60 is fixed to the housing 50 interior. The second slider 58 can slide in the front-rear direction and the left-right direction with respect to the circuit board 60. The circuit board 60 can detect the front-rear direction position and the left-right direction position of the magnet of the second slider 58.

Operation of the present embodiment is described next.

In the shift lever device 10 of the above-described structure, the shift position of the shift lever 24 is changed due to the shift lever 24 being pivotally operated in the front-rear direction and the left-right direction.

Here, the link 42 is connected to the connecting pillar 28 of the shift lever 24 and the connecting shaft 20 of the retainer 16. Due thereto, at the time when the shift lever 24 is pivotally operated in the front-rear direction, due to the retainer 16 and the link 42 being pivoted in the front-rear direction integrally with the shift lever 24, the pivot portion 42A of the link 42 is pivoted in the front-rear direction. Moreover, at the time when the shift lever 24 is pivotally operated in the left-right direction, the shift lever 24 is pivoted in the left-right direction with respect to the retainer 16, and the link 42 is pivoted in the left-right direction, and the pivot portion 42A of the link 42 is thereby pivoted in the left-right direction.

Moreover, at the detecting mechanism 48, the pivot portion 42A of the link 42 is pivotably and slidably fit in the connecting tube 58A of the second slider 58. Due thereto, at the time when the shift lever 24 is pivotally operated in the front-rear direction, at the detecting mechanism 48, the second slider 58 is slid in the front-rear direction with respect to the first slider 54. Moreover, at the time when the shift lever 24 is pivotally operated in the left-right direction, the second slider 58 is slid integrally with the first slider 54 in the left-right direction.

Therefore, at the detecting mechanism 48, due to the circuit board 60 detecting the front-rear direction position and the left-right direction position of the magnet of the second slider 58, the front-rear direction position and the left-right direction position of the pivot portion 42A of the link 42 are detected, and the shift position of the shift lever 24 is detected. Due thereto, the shift position of the shift lever 24 can be detected via the link 42, even in a case in which the shift lever 24 is pivotally operated in the front-rear direction and the left-right direction.

Further, at the time when the shift lever 24 is pivotally operated in the left-right direction, the pivoted distance in the left-right direction of the pivot portion 42A of the link 42 is amplified with respect to the pivoted distance in the left-right direction at the disposed position of the shift lever 24 (the disposed position of the shift lever 24 where it is assumed that the shift lever 24 is disposed at that disposed position at which the pivot portion 42A is disposed). Therefore, the pivoted amount of the pivot portion 42A in the left-right direction, that is due to the pivoting operation of the shift lever 24 in the left-right direction, can be made to be large, and the accuracy of detecting the shift position of the shift lever 24 in the left-right direction can be improved. Moreover, by adjusting the vertical distance between the pivot portion 42A and at least one of the connecting pillar 28 of the shift lever 24 and the connecting shaft 20 of the retainer 16, the pivoted amount of the pivot portion 42A in the left-right direction, that is due to the pivoting operation of the shift lever 24 in the left-right direction, can be adjusted easily, and the pivoted amount of the pivot portion 42A in the left-right direction can easily be made to correspond to a prescribed amount of sliding of the second slider 58 of the detecting mechanism 48 in the left-right direction.

Moreover, the pivot portion 42A is closer to the select shaft 18 in the vertical direction than the shift shaft 14. The pivoted distance in the left-right direction at that disposed position of the shift lever 24, that is due to the pivoting operation of the shift lever 24 in the left-right direction, is made to be small as compared with the pivoted distance in the front-rear direction at that disposed position of the shift lever 24, that is due to the pivoting operation of the shift lever 24 in the front-rear direction. Therefore, even if the pivoted distance in the left-right direction at that disposed position of the shift lever 24 due to pivoting operation of the shift lever 24 in the left-right direction is small, as described above, the pivoted amount of the pivot portion 42A in the left-right direction, that is due to pivoting operation of the shift lever 24 in the left-right direction, can be made to be large, and the accuracy of detecting the shift position of the shift lever 24 in the left-right direction can be improved.

Further, at the time when the shift lever 24 is pivotally operated in the front-rear direction and the shift lever 24 is pivoted integrally with the retainer 16 in the front-rear direction, pivoting of the assisting hole 46 (the link 42) in the front-rear direction with respect to the assisting plate 22 (the retainer 16) is limited, and pivoting of the link 42 in the front-rear direction with respect to the retainer 16 is limited. On the other hand, at the time when the shift lever 24 is pivotally operated in the left-right direction and the shift lever 24 is pivoted in the left-right direction with respect to the retainer 16, pivoting of the assisting hole 46 in the left-right direction with respect to the assisting plate 22 is guided, and pivoting of the link 42 in the left-right direction with respect to the retainer 16 is guided. Therefore, pivoting of the pivot portion 42A of the link 42 in the front-rear direction and the left-right direction, that is due to the pivoting operation of the shift lever 24, is assisted by the assisting hole 46 and the assisting plate 22, and due thereto, the accuracy of the pivoted position of the pivot portion 42A in the front-rear direction and the left-right direction due to the pivoting operation of the shift lever 24 can be increased, and the accuracy of detecting the shift position of the shift lever 24 in the front-rear direction and the left-right direction can be improved.

Moreover, the assisting hole 46 and the pivot portion 42A are provided at the lower end portion of the link 42, and the assisting hole 46 is close to the pivot portion 42A. Therefore, pivoting of the pivot portion 42A in the front-rear direction and the left-right direction, that is due to the pivoting operation of the shift lever 24, can be effectively assisted by the assisting hole 46 and the assisting plate 22, and the accuracy of the pivoted position of the pivot portion 42A in the front-rear direction and the left-right direction, that is due to the pivoting operation of the shift lever 24, can be increased effectively, and the accuracy of detecting the shift position of the shift lever 24 in the front-rear direction and the left-right direction can be improved effectively.

Further, at the time when the shift lever 24 is pivotally operated in the front-rear direction in the range between the "R" position and the "D" position, at the central pivoted position of the pivot portion 42A in the front-rear direction, the pivot portion 42A is disposed at the lowest position and is closest to the detecting mechanism 48. Moreover, at the time when the shift lever 24 is pivotally operated in the left-right direction in the range between the "H" position and the 'N" position, at the central pivoted position of the pivot portion 42A in the left-right direction, the pivot portion 42A is disposed at the lowest position and is closest to the detecting mechanism 48. Therefore, the amount by which the pivot portion 42A approaches and moves away from the detecting mechanism 48 in the vertical direction (the amount of displacement in the vertical direction (the pivoting radius direction at the central pivoted position of the pivot portion 42A)) can be made to be small, and the axial direction dimension (the vertical direction dimension) of the connecting tube 58A of the second slider 58 at the detecting mechanism 48 can be made to be small, and the detecting mechanism 48 can be made to be compact.

Moreover, at the time when the shift lever 24 is pivotally operated in the front-rear direction in the range between the "R" position and the "D" position, at the central pivoted position of the pivot portion 42A in the front-rear direction that corresponds to the "N" position of the shift lever 24, the pivot portion 42A is disposed at the lowest position. Therefore, the front-rear direction distance between the pivoted position of the pivot portion 42A that corresponds to the "R" position of the shift lever 24 and the pivoted position of the pivot portion 42A that corresponds to the "N" position of the shift lever 24, and the front-rear direction distance between the pivoted position of the pivot portion 42A that corresponds to the "N" position of the shift lever 24 and the pivoted position of the pivot portion 42A that corresponds to the "D" position of the shift lever 24, can be made to be equal, and the pivoted positions of the pivot portion 42A, that correspond to the "R" position, the "N" position and the "D" position of the shift lever 24 respectively, can be set apart uniformly in the front-rear direction. Due thereto, the accuracy of detecting the shift position of the shift lever 24 in the front-rear direction can be improved.

Second Embodiment

Figure 4:
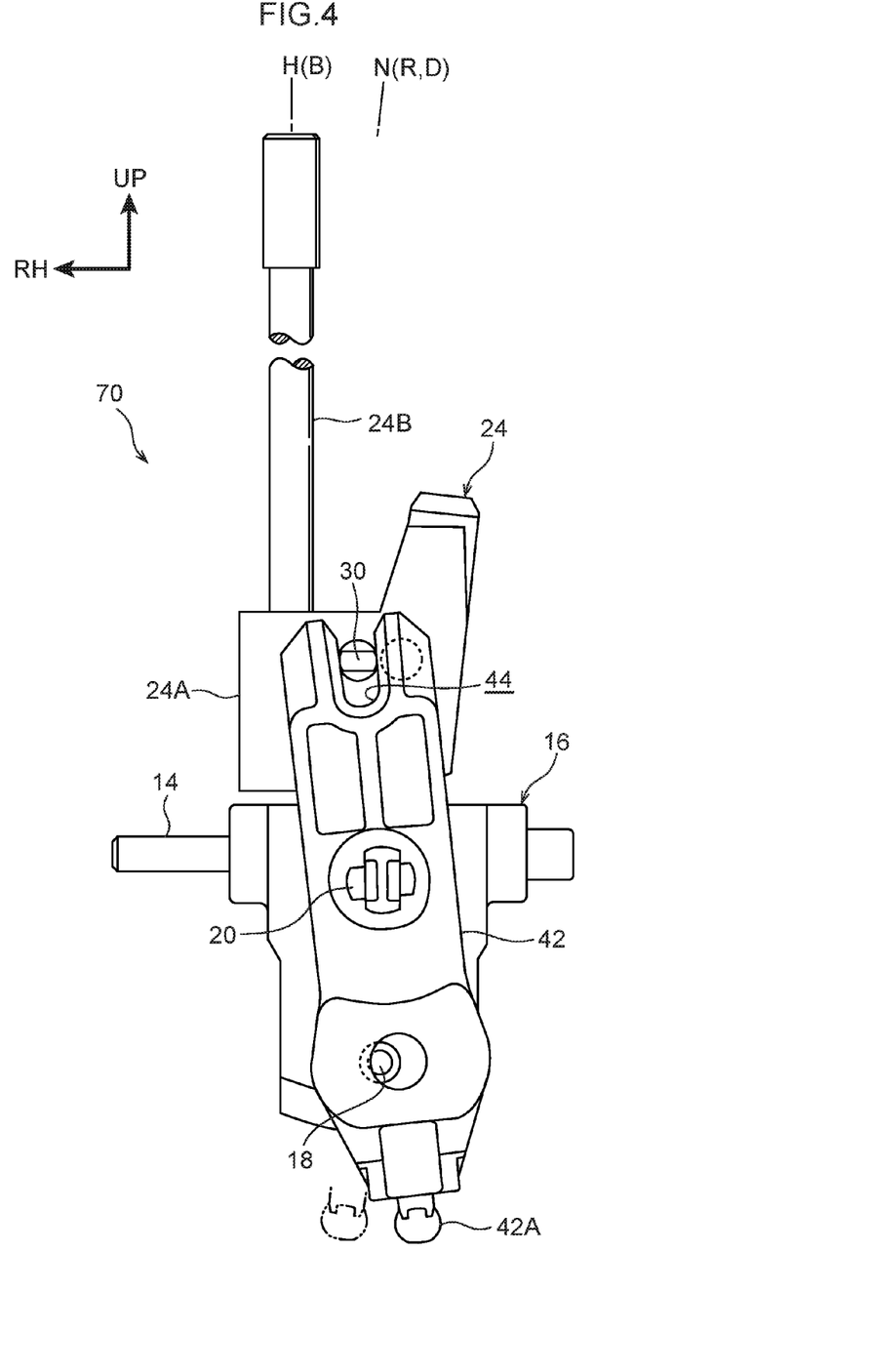
FIG. 4 is a front view that is seen from the front and shows main portions of a shift lever device relating to a second embodiment of the present invention.

Main portions of a shift lever device 70, that serves as a shift device relating to a second embodiment of the present invention, are shown in FIG. 4 in a front view seen from the front. Main portions of the shift lever device 70 are shown in FIG. 5 in a side view seen from the left.

The shift lever device 70 relating to the present embodiment is a structure that is substantially similar to the above-described first embodiment, but differs with respect to the following points.

The vehicle, to which the shift lever device 70 relating to the present embodiment is applied, is a left-hand drive vehicle, and the driver's seat is disposed at the front side and the left side of the vehicle cabin, and the shift lever device 70 is disposed at the vehicle cabin right side of the driver's seat.

Figure 5:
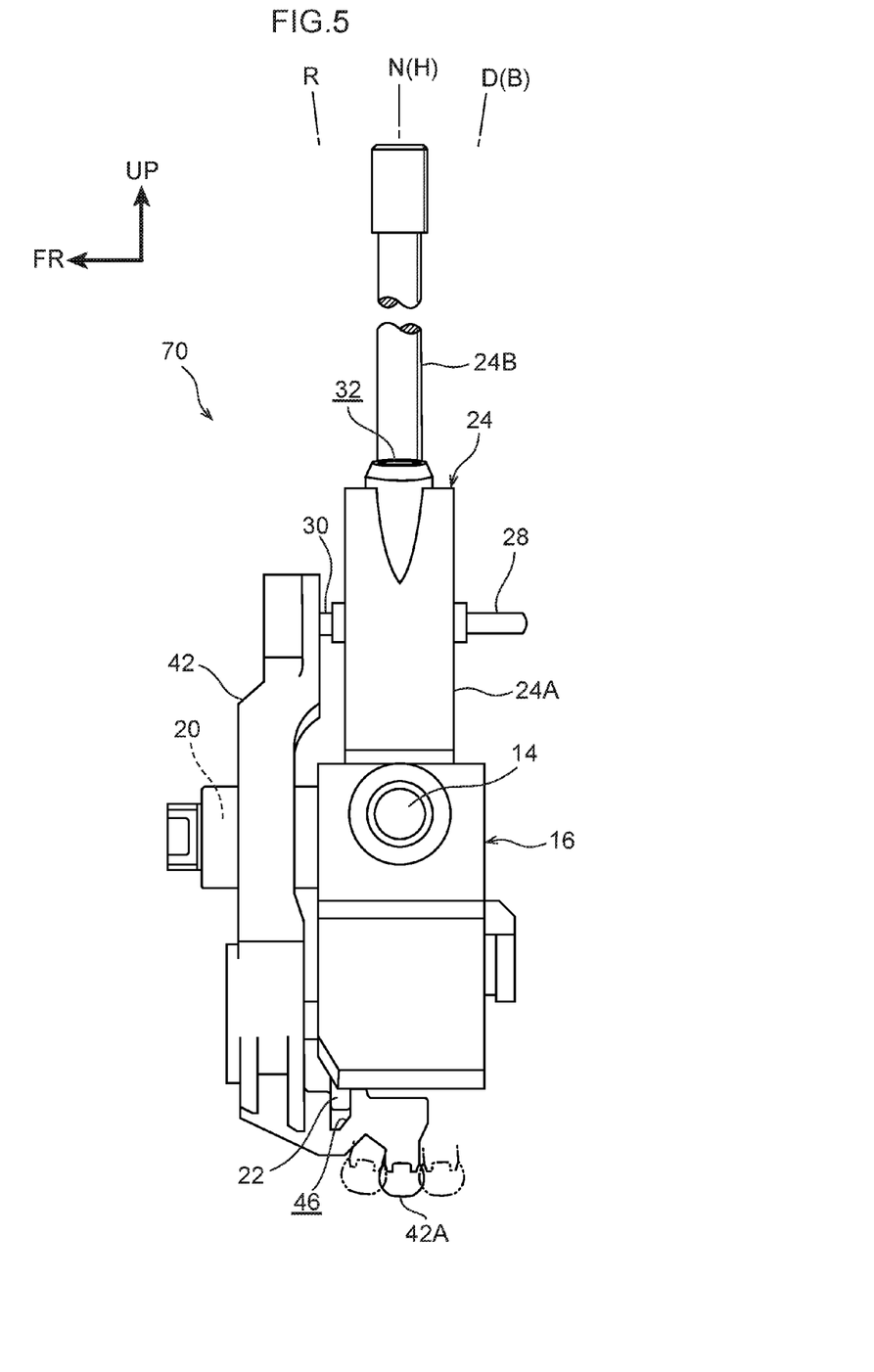
FIG. 5 is a side view that is seen from the left and shows main portions of the shift lever device relating to the second embodiment of the present invention.

As shown in FIG. 4 and FIG. 5, the shift lever 24 (including the compression coil spring 34 and the detent pin 36) is disposed so as to be reversed around the vertical direction as compared with the case of the above-described first embodiment.

The guide hole 40 and the regulating surface of the gate plate 38 are made to be shapes that are reversed with respect to the left-right direction central plane of the gate plate 38, as compared with the above-described first embodiment. Therefore, in the present embodiment, the guide hole 40 is made to be h-shaped as seen in plan view.

The shift position of the shift lever 24 is at the "H" position, and, due to the shift lever 24 being pivotally operated toward the rear side from the "H" position, the shift position of the shift lever 24 is changed to the "B" position, and, due to the shift lever 24 being pivotally operated toward the left side from the "H" position, the shift position of the shift lever 24 is changed to the "N" position. Moreover, due to the shift lever 24 being pivotally operated toward the rear side from the "N" position, the shift position of the shift lever 24 is changed to the "D" position, and, due to the shift lever 24 being pivotally operated toward the front side from the "N" position, the shift position of the shift lever 24 is changed to the "R" position.

The connecting pillar 30 at the front side of the shift lever 24 (the shift portion 24A) is inserted in the connecting hole 44 of the link 42, and the transverse direction central plane of the link 42 is inclined in the direction of heading toward the left while heading downward. Therefore, as compared with the case of the above-described first embodiment, the link 42 is disposed symmetrically with respect to a plane that is orthogonal to the left-right direction and that passes-through the central axis of the connecting shaft 20 of the retainer 16.

At the time when the shift lever 24 is pivotally operated in the front-rear direction in the range between the "R" position and the "D" position, at the central pivoted position (the position of the center of the range of pivoting, the "N" position of the shift lever 24) of the pivot portion 42A of the link 42 in the front-rear direction, the pivot portion 42A is disposed at the lowest position, and the range of pivoting of the pivot portion 42A in the front-rear direction is the same as in the case of the above-described first embodiment (see FIG. 5).

At the time when the shift lever 24 is pivotally operated in the left-right direction in the range between the "H" position and the "N" position, at the central pivoted position (the position of the center of the range of pivoting) of the pivot portion 42A in the left-right direction, the pivot portion 42A is disposed at the lowest position, and the range of pivoting of the pivot portion 42A in the left-right direction is the same as in the case of the above-described first embodiment (see FIG. 4).

At the detecting mechanism 48, the circuit board 60 is structured so as to be reversed with respect to the left-right direction central plane, as compared with the case of the above-described first embodiment.

Here, in the present embodiment as well, operation and effects that are similar to those of the above-described first embodiment can be achieved.

Further, comparing in the case of the above-described first embodiment (a right-hand drive vehicle) and in the case of the above-described second embodiment (a left-hand drive vehicle), even though the shift lever 24 is disposed so as to be reversed around the vertical direction, and the link 42 is disposed so as to be symmetrical with respect to a plane that is orthogonal to the left-right direction and that passes-through the central axis of the connecting shaft 20 of the retainer 16, the range of pivoting of the pivot portion 42A in the front-rear direction and the range of pivoting of the pivot portion 42A in the left-right direction are the same. Therefore, the shift lever 24 (including the compression coil spring 34 and the detent pin 36), the retainer 16 (including the select shaft 18), the link 42 and the detecting mechanism 48 (except for the circuit board 60) can be used in common in the case of the above-described first embodiment and the case of the above-described second embodiment, and these parts can be used in common at a right-hand drive vehicle and a left-hand drive vehicle, and the manufacturing cost of these parts can be reduced.

Moreover, the plate 12 (including the shift shaft 14) is used in common in the case of the above-described first embodiment (a right-hand drive vehicle) and the case of the second embodiment (a left-hand drive vehicle). Therefore, the plate 12 (including the shift shaft 14) can be used in common at a right-hand drive vehicle and a left-hand drive vehicle, and the manufacturing cost of the plate 12 (including the shift shaft 14) can be reduced.

Note that, in the above-described first embodiment and second embodiment, at the time when the shift lever 24 is pivotally operated in the left-right direction, the pivoted distance of the pivot portion 42A of the link 42 in the left-right direction is amplified with respect to the pivoted distance in the left-right direction at the disposed position of the shift lever 24 (the disposed position of the shift lever 24 where it is assumed that the shift lever 24 is disposed at that disposed position at which the pivot portion 42A is disposed). However, in particular, in a case in which the pivot portion 42A is closer to the shift shaft 14 in the vertical direction than the select shaft 18, instead of this, or together with this, at the time when the shift lever 24 is pivotally operated in the front-rear direction, the pivoted distance of the pivot portion 42A of the link 42 in the front-rear direction may be amplified with respect to the pivoted distance in the front-rear direction at that disposed position of the shift lever 24. In this case, the shift lever 24 is supported so as to be able to pivot in the front-rear direction at least in a predetermined range, and the link 42 is connected to the shift lever 24 and the retainer 16 so as to be pivotable in the front-rear direction.

Moreover, comparing in the case of the above-described first embodiment and in the case of the above-described second embodiment, the link 42 is disposed symmetrically with respect to a plane that is orthogonal to the left-right direction. However, comparing in the case of the above-described first embodiment and in the case of the above-described second embodiment, the link 42 may be disposed symmetrically with respect to a plane that is orthogonal to the front-rear direction.

Further, in the above-described first embodiment and second embodiment, the shift lever devices 10, 70 are made to be floor-type devices and are set at the floor portion of the vehicle cabin. However, the shift lever devices 10, 70 may be set at the steering column or the instrument panel of a vehicle.

The disclosure of Japanese Patent Application No. 2013-236164 that was filed on Nov. 14, 2013 is, in its entirety, incorporated by reference into the present specification.

EXPLANATION OF REFERENCE NUMERALS 10 shift lever device (shift device)
12 plate (supporting body)
16 retainer (intermediate body)
24 shift lever (shift body)
42 link (moving body)
42A pivot portion (moving portion)
48 detecting mechanism (detecting means)
70 shift lever device (shift device)

The invention claimed is:

1. A vehicular transmission shift device comprising:
a shift body having a proximal and a distal end whose shift position is changed due to the proximal end of the shift body being moved in one direction or another direction;
an intermediate body that supports the shift body such that the shift body is pivotally moveable in the other direction;
a supporting body that supports the intermediate body such that the shift body is pivotally moveable with the intermediate body in the one direction;
a moving body that is connected to the shift body and the intermediate body, and that is moveable at all portions with respect to the intermediate body and provided with a moving portion which is moved in the one direction and the other direction due to the proximal end of the shift body being moved in the one direction and the other direction; and
detecting means for detecting the shift position of the shift body, by detecting the moving portion,
wherein the moving portion of the moving body extends beyond the distal end of the shift body such that pivotal movement of the distal end of the moving portion due to pivoting of the proximal end of the shift body is greater than pivotal movement of the distal end of the shift body.

2. The shift device of claim 1, wherein the moved distance of the moving portion is larger than a moved distance of the connected portion of the shift body, at a time when the shift body is moved in one of the one direction or the other direction, the one of the one direction or the other direction being a direction in which the moved distance of the connected portion of the shift body is smaller than in another of the one direction or the other direction.

3. The shift device of claim 1, the moving body being connected to a region of the shift body and a region of the intermediate body, and further comprising an assisting portion that links the moving body and the intermediate body at a location of the moving body other than the regions connected to the shift body and the intermediate body,
wherein the link formed by the assisting portion limits relative movement of the moving portion with respect to the shift body at the location of the assisting portion at a time when the shift body is moved in the one direction, and guides movement of the moving portion with respect to the shift body at the location of the assisting portion at a time when the shift body is moved in the other direction.

4. The shift device of claim 1, wherein, due to the shift body being moved in at least one of the one direction or the other direction, the moving portion is pivoted, and the detecting means detects a position in a pivoting straight line tangent direction at a middle position of a pivoted range of the moving portion, and the moving portion is closest to the detecting means at the middle position.

5. The shift device of claim 1, wherein the one direction and the another direction of movement of the shift body are orthogonal to one another.

6. The shift device of claim 1, wherein the intermediate body is movable about a first pivot axis in the supporting body in the one direction, the shift body is movable about a second pivot axis in the intermediate body in the other direction, and the moving portion of the moving body is located at a point opposite from the shift body and beyond the first and second pivot axes.

7. A vehicular transmission shift device comprising:
a shift lever whose shift position is changed due to a proximal end of the shift lever being pivoted in one direction or another direction;
a retainer that supports a distal end of the shift lever such that the shift lever is pivotally moveable in the another direction with respect to the retainer;
a housing that supports the retainer such that the shift lever is pivotally moveable with the retainer in the one direction with respect to the housing;
a link that is connected to the shift lever and the retainer, and that is moveable at all portions with respect to the retainer and provided with a distal end that is pivotally moved in the one direction and the another direction due to the shift body being pivotally moved in the one direction and the another direction, the distal end of the link extending beyond the distal end of the shift lever such that pivotal movement of the distal end of the link due to pivoting of the proximal end of the shift lever is greater than pivotal movement of the distal end of the shift lever; and
detecting means for detecting the shift position of the shift body, by detecting the moving portion.

8. The shift device of claim 7, wherein the link is connected to a region of the shift lever and a region of the retainer, and further comprising an assisting portion that connects the link and the retainer at a location of the link other than the regions connected to the shift body and the intermediate body, wherein the connection formed by the assisting portion limits relative movement of the proximal end of the link with respect to the shift lever at the location of the assisting portion at a time when the shift lever is moved in the one direction, and guides movement of the proximal end of the link with respect to the shift lever at the location of the assisting portion at a time when the shift lever is moved in the another direction.

* * * * *